United States Patent
Li et al.

(10) Patent No.: US 10,028,181 B2
(45) Date of Patent: Jul. 17, 2018

(54) METHOD, APPARATUS FOR CONFIGURING NEIGHBORING CELL, AND FOR REPORTING NEIGHBORING CELL INFORMATION

(71) Applicant: Huawei Technologies Co., Ltd., Shenzhen (CN)

(72) Inventors: Jiantao Li, Kuala Lumpur (MY); Juntao Wu, Shanghai (CN); Jie Sun, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/360,793

(22) Filed: Nov. 23, 2016

(65) Prior Publication Data

US 2017/0078929 A1 Mar. 16, 2017

Related U.S. Application Data

(63) Continuation of application No. PCT/CN2014/078235, filed on May 23, 2014.

(51) Int. Cl.
*H04W 36/00* (2009.01)
*H04W 48/20* (2009.01)
*H04W 36/14* (2009.01)
*H04W 24/02* (2009.01)
*H04W 84/12* (2009.01)

(52) U.S. Cl.
CPC ....... *H04W 36/0061* (2013.01); *H04W 24/02* (2013.01); *H04W 36/0066* (2013.01); *H04W 36/0083* (2013.01); *H04W 36/14* (2013.01); *H04W 48/20* (2013.01); *H04W 84/12* (2013.01)

(58) Field of Classification Search
CPC . H04M 1/72519; H04W 88/06; H04W 36/04; H04W 84/12; H04W 36/0061; H04W 36/14; H04W 36/0064
USPC .................... 455/444, 552.1, 550.1; 370/338
See application file for complete search history.

(56) References Cited

U.S. PATENT DOCUMENTS

| 7,751,818 | B2 | 7/2010 | Chaskar et al. | |
|---|---|---|---|---|
| 9,674,760 | B2* | 6/2017 | Kim | H04W 36/36 |
| 9,825,748 | B2* | 11/2017 | Liang | H04L 5/0073 |
| 2009/0154435 | A1* | 6/2009 | Chung | H04W 88/08 370/338 |
| 2009/0170531 | A1* | 7/2009 | Hampel | H04L 12/5865 455/456.3 |
| 2010/0105382 | A1* | 4/2010 | Gallagher | H04W 4/20 455/434 |

(Continued)

FOREIGN PATENT DOCUMENTS

| CN | 102318237 A | 1/2012 |
|---|---|---|
| CN | 103068007 A | 4/2013 |

(Continued)

*Primary Examiner* — Danh Le (74) *Attorney, Agent, or Firm* — Leydig, Voit & Mayer, Ltd.

(57) ABSTRACT

The embodiments of the present application provide a method for configuring a neighboring cell, and for reporting neighboring cell information. The embodiments of the present application can implement automatic configuration of neighboring cell information, which does not require manual test and configuration of a live network.

5 Claims, 6 Drawing Sheets

(56) References Cited

U.S. PATENT DOCUMENTS

| | | | | |
|---|---|---|---|---|
| 2010/0118847 A1* | 5/2010 | Lee | ............... | H04W 48/08 |
| | | | | 370/338 |
| 2011/0269467 A1* | 11/2011 | Leclerc | ............ | H04W 48/02 |
| | | | | 455/436 |
| 2014/0079007 A1* | 3/2014 | Li | ............... | H04W 28/10 |
| | | | | 370/329 |
| 2014/0112306 A1* | 4/2014 | Zhou | ............ | H04W 72/10 |
| | | | | 370/331 |
| 2014/0273910 A1* | 9/2014 | Ballantyne | ............ | H04W 4/22 |
| | | | | 455/404.1 |
| 2015/0022343 A1* | 1/2015 | Sanders | ............ | A61B 5/746 |
| | | | | 340/521 |
| 2015/0146687 A1* | 5/2015 | Kim | ............ | H04W 76/023 |
| | | | | 370/331 |
| 2015/0223049 A1 | 8/2015 | Luo et al. | | |
| 2015/0296450 A1* | 10/2015 | Koo | ............ | H04W 24/04 |
| | | | | 455/435.3 |
| 2016/0212672 A1 | 7/2016 | Fu et al. | | |

FOREIGN PATENT DOCUMENTS

| | | |
|---|---|---|
| CN | 103781172 A | 5/2014 |
| EP | 2120369 A1 | 11/2009 |
| EP | 2720508 A1 | 4/2014 |
| JP | 2006332833 A | 12/2006 |
| JP | 2009182904 A | 8/2009 |
| JP | 2012063322 A | 3/2012 |
| JP | 2013115599 A | 6/2013 |
| WO | WO 2005055633 A2 | 6/2005 |
| WO | 2008084621 A1 | 7/2008 |
| WO | WO 2014059640 A1 | 4/2014 |

\* cited by examiner

METHOD, APPARATUS FOR CONFIGURING NEIGHBORING CELL, AND FOR REPORTING NEIGHBORING CELL INFORMATION

CROSS-REFERENCE TEMPLATES

This application is a continuation of International Application No. PCT/CN2014/078235, filed on May 23, 2014, the disclosure of which is hereby incorporated by reference in its entirety.

TECHNICAL FIELD

The embodiments of the present invention relate to the field of communications technologies, and in particular, to a method, apparatus and device for configuring a neighboring cell, and for reporting neighboring cell information.

BACKGROUND

After a large increase of data users in a conventional macro cellular network, because the large quantity of users content for network resources together, a packet switch (PS) rate decreases rapidly, resulting in undesirable user experience. To improve the PS rate, an efficient offloading method is required, and the offloading method is to transfer the data users in the macro cellular network to other networks. A wireless local area network (WLAN) network is a most effective solution with high quality and a low price.

Because the macro cellular network and the WLAN network are wireless networks of two different types, during offloading from the macro cellular network by using the WLAN network, a problem of coordination between the WLAN network and the macro cellular network is involved. To implement a precise load balance between the macro cell and the WLAN network, clear neighboring cell configuration needs to be performed on each macro cell of the macro cellular network and cells of the WLAN network.

For the neighboring cell configuration in the prior art, mainly a live network test is performed manually, and then manual configuration is performed according to a test result. Manual configuration is labor-consuming.

SUMMARY

In view of this, embodiments of the present invention provide a method for configuring a neighboring cell, a method for reporting neighboring cell information, apparatuses, and devices, so as to resolve a problem that in neighboring cell configuration in the prior art, mainly a live network test is performed manually, and manual configuration is performed according to a test result. Manual configuration is labor-consuming. The technical solutions of the embodiments of the present invention are as follows.

According to a first aspect, an apparatus for configuring a neighboring cell is applied to an inter-network coordination device and includes a first establishment module, a receiving module, and a second establishment module, where the first establishment module is configured to: establish a correspondence between a cell identifier of a macro cell in a macro cellular network and a media access control (STA MAC) address of a terminal device, and use the established correspondence as a first correspondence;

the receiving module is configured to: receive a correspondence that is sent by an access point (AP) in a wireless local area network (WLAN) and that is between the STA MAC address and an identity of the AP, and use the received correspondence as a second correspondence; and the second establishment module is configured to establish, by using the first correspondence established by the first establishment module and the second correspondence received by the receiving module, a correspondence between the cell identifier of the macro cell in the macro cellular network and the identity of the AP in the WLAN.

In a first possible implementation manner of the first aspect, the first establishment module includes: a receiving submodule, a determining submodule, and a first establishment submodule, where the receiving submodule is configured to receive the STA MAC address and a terminal device identifier (UE ID) that are reported by the terminal device by using the macro cellular network;

the determining submodule is configured to determine a cell identifier that is of a macro cell and that corresponds to the UE ID received by the receiving submodule; and the first establishment submodule is configured to establish a correspondence between the STA MAC address received by the receiving submodule and the cell identifier that is of the macro cell and that is determined by the determining submodule.

With reference to the first aspect or the first possible implementation manner of the first aspect, in a second possible implementation manner of the first aspect, the second establishment module includes a search submodule, an obtaining submodule, and a second establishment submodule, where the search submodule is configured to: search the first correspondence for a STA MAC address that is the same as the STA MAC address in the second correspondence, and use the found STA MAC address as a first STA MAC address;

the obtaining submodule is configured to: obtain, from the first correspondence, a cell identifier corresponding to the first STA MAC address found by the search submodule as a first cell identifier, and obtain, from the second correspondence, an identity of an AP corresponding to the first STA MAC address found by the search submodule as an identity of a first AP; and the second establishment submodule is configured to establish a correspondence between the first cell identifier obtained by the obtaining submodule and the identity of the first AP.

According to a second aspect, an apparatus for reporting neighboring cell information is applied to a terminal device and includes a first sending module and a second sending module, where the first sending module is configured to send, by using a macro cellular network, a media access control address (STA MAC) address of the terminal device and a terminal device identifier (UE ID) to an inter-network coordination device, where the UE ID is used to determine a cell identifier that corresponds to the STA MAC address and that is of a macro cell in the macro cellular network; and the second sending module is configured to send a probing request carrying the STA MAC address to an access point (AP) in a wireless local area network (WLAN), so that the AP in the WLAN establishes a correspondence between an identity of the AP and the STA MAC address and sends the correspondence to the inter-network coordination device.

According to a third aspect, an apparatus for configuring a neighboring cell is applied to an inter-network coordination device and includes a receiving module, a determining module, and an establishment module, where the receiving module is configured to receive a correspondence that is reported by a terminal device by using a macro cellular network and that is between an identity of an access point (AP) in a wireless local area network (WLAN) and a terminal device identifier (UE ID);

the determining module is configured to determine a cell identifier that is of a macro cell in the macro cellular network and that corresponds to the UE ID in the correspondence received by the receiving module; and the establishment module is configured to establish a correspondence between the cell identifier that is determined by the determining module and that is of the macro cell and the identity of the AP in the correspondence received by the receiving module.

According to a fourth aspect, an apparatus for reporting neighboring cell information is applied to a terminal device and includes an obtaining module, an establishment module, and a sending module, where the obtaining module is configured to obtain an identity of an access point (AP) in a wireless local area network;

the establishment module is configured to establish a correspondence between a terminal device identifier (UE ID) and the identity that is of the AP and that is obtained by the obtaining module; and the sending module is configured to send, by using a macro cellular network, the correspondence established by the establishment module to an inter-network coordination device, where the UE ID is used to determine a cell identifier that corresponds to the identity of the AP in the wireless local area network and that is of a macro cell in the macro cellular network.

In a first possible implementation manner of the fourth aspect, the obtaining module includes: a sending submodule, a receiving submodule, and an extraction submodule, where the sending submodule is configured to send a probing request message to the AP in the wireless local area network;

the receiving submodule is configured to receive a probing response message sent by the AP, where the probing response message carries the identity of the AP; and the extraction submodule is configured to extract the identity of the AP from the probing response message received by the receiving submodule.

According to a fifth aspect, an inter-network coordination device includes at least a memory and a processor, where the memory is configured to store a group of first program instructions; and the processor invokes the first program instructions stored in the memory to execute the following operations:

establishing a correspondence between a cell identifier of a macro cell in a macro cellular network and a media access control address (STA MAC) address of a terminal device, and using the established correspondence as a first correspondence;

receiving a correspondence that is sent by an access point (AP) in a wireless local area network (WLAN) and that is between the STA MAC address and an identity of the AP, and using the received correspondence as a second correspondence; and establishing, by using the first correspondence and the second correspondence, a correspondence between the cell identifier of the macro cell in the macro cellular network and the identity of the AP in the wireless local area network.

According to a sixth aspect, a terminal device includes at least a memory and a processor, where the memory is configured to store a group of second program instructions; and the processor invokes the second program instructions stored in the memory to execute the following operations:

reporting, by using a macro cellular network, a media access control address (STA MAC) address and a terminal device identifier (UE ID) to an inter-network coordination device, where the UE ID is used to determine an identifier that corresponds to the STA MAC address and that is of a macro cell in the macro cellular network; and sending a probing request carrying the STA MAC address to an access point (AP) in a wireless local area network, so that the AP in the wireless local area network (WLAN) establishes a correspondence between the identity of the AP and the STA MAC address and sends the correspondence to the inter-network coordination device.

According to a seventh aspect, an inter-network coordination device includes at least a memory and a processor, where the memory is configured to store a group of third program instructions; and the processor invokes the third program instructions stored in the memory to execute the following operations:

receiving a correspondence that is reported by a terminal device by using a macro cellular network and that is between an identity of an access point (AP) in a wireless local area network (WLAN) and a terminal device identifier (UE ID);

determining a cell identifier that is of a macro cell in the macro cellular network and that corresponds to the UE ID; and establishing a correspondence between the cell identifier of the macro cell in the macro cellular network and the identity of the AP in the WLAN.

According to an eighth aspect, a terminal device includes at least a memory and a processor, where the memory is configured to store a group of fourth program instructions; and the processor invokes the fourth program instructions stored in the memory to execute the following operations:

obtaining an identity of an access point (AP) in a wireless local area network (WLAN);

establishing a correspondence between the identity of the AP and a terminal device identifier (UE ID); and sending the correspondence to an inter-network coordination device by using a macro cellular network, where the UE ID is used to determine a cell identifier that corresponds to the identity of the AP in the WLAN network and that is of a macro cell in the macro cellular network.

According to a ninth aspect, a method for configuring a neighboring cell includes:

establishing, by an inter-network coordination device, a correspondence between a cell identifier of a macro cell in a macro cellular network and a media access control (STA MAC) address of a terminal device, and using the established correspondence as a first correspondence;

receiving, by the inter-network coordination device, a correspondence that is sent by an access point (AP) in a wireless local area network (WLAN) and that is between the STA MAC address and an identity of the AP, and using the received correspondence as a second correspondence; and establishing, by the inter-network coordination device by using the first correspondence and the second correspondence, a correspondence between the cell identifier of the macro cell in the macro cellular network and the identity of the AP in the WLAN.

In a first possible implementation manner of the ninth aspect, the establishing, by an inter-network coordination device, a correspondence between a cell identifier of a macro cell in a macro cellular network and a STA MAC address includes:

receiving, by the inter-network coordination device, the STA MAC address and a terminal device identifier (UE ID) that are reported by the terminal device by using the macro cellular network;

determining a cell identifier that corresponds to the UE ID and that is of a macro cell; and establishing a correspondence between the STA MAC address and the cell identifier of the macro cell.

With reference to the ninth aspect or the first possible implementation manner of the ninth aspect, in a second possible implementation manner of the ninth aspect, the establishing, by the inter-network coordination device by using the first correspondence and the second correspondence, a correspondence between the cell identifier of the macro cell in the macro cellular network and the identity of the AP in the WLAN includes:

searching, by the inter-network coordination device, the first correspondence for a STA MAC address that is the same as the STA MAC address in the second correspondence, and using the found STA MAC address as a first STA MAC address;

obtaining, from the first correspondence, a cell identifier corresponding to the first STA MAC address as a first cell identifier, and obtaining, from the second correspondence, the identity of the AP corresponding to the first STA MAC address as an identity of a first AP; and establishing a correspondence between the first cell identifier and the identity of the first AP.

According to a tenth aspect, a method for reporting neighboring cell information includes:

sending, by a terminal device by using a macro cellular network, a media access control STA MAC address of the terminal device and a terminal device identifier (UE ID) to an inter-network coordination device, where the UE ID is used to determine a cell identifier that corresponds to the STA MAC address and that is of a macro cell in the macro cellular network; and sending, by the terminal device, a probing request carrying the STA MAC address to an access point (AP) in a wireless local area network (WLAN), so that the AP in the WLAN establishes a correspondence between an identity of the AP and the STA MAC address and sends the correspondence to the inter-network coordination device.

According to an eleventh aspect, a method for configuring a neighboring cell includes:

receiving, by an inter-network coordination device, a correspondence that is reported by a terminal device by using a macro cellular network and that is between an identity of an access point (AP) in a wireless local area network (WLAN) and a terminal device identifier (UE ID);

determining, by the inter-network coordination device, a cell identifier that is of a macro cell in the macro cellular network and that corresponds to the UE ID; and establishing, by the inter-network coordination device, a correspondence between the cell identifier of the macro cell in the macro cellular network and the identity of the AP in the WLAN.

According to a twelfth aspect, a method for reporting neighboring cell information includes:

obtaining, by a terminal device, an identity of an access point (AP) in a wireless local area network (WLAN);

establishing, by the terminal device, a correspondence between the identity of the AP and a terminal device identifier (UE ID); and sending, by the terminal device, the correspondence to an inter-network coordination device by using a macro cellular network, where the UE ID is used to determine a cell identifier that corresponds to the identity of the AP in the WLAN and that is of a macro cell in the macro cellular network.

In a first possible implementation manner of the twelfth aspect, the obtaining, by a terminal device, an identity of an AP in a wireless local area network (WLAN) is specifically:

sending, by the terminal device, a probing request message to the AP in the WLAN;

receiving a probing response message sent by the AP, where the probing response message carries the identity of the AP; and extracting the identity of the AP from the probing response message.

The foregoing technical solutions have the following beneficial effects:

In the method for configuring a neighboring cell, the method for reporting neighboring cell information, the apparatuses, and the devices that are provided in the embodiments of the present invention, an inter-network coordination device may establish a correspondence between a STA MAC address on a macro network side and a cell identifier of a macro cell; after receiving a correspondence that is sent by an AP in a WLAN network and that is between the STA MAC address and an identity of the AP, the inter-network coordination device may match the received STA MAC address with the STA MAC address on the macro network side, so as to further establish a correspondence between the cell identifier of the macro cell in a macro cellular network and the identity of the AP in the WLAN network. Alternatively, the inter-network coordination device may receive a correspondence that is reported by a terminal device and that is between the identity of the AP and a UE ID, and then further establish, by using the correspondence, a correspondence between the cell identifier of the macro cell and the identity of the AP. The method for configuring a neighboring cell, the method for reporting neighboring cell information, the apparatuses, and the devices that are provided in the embodiments of the present invention can implement automatic configuration (for example, automatic establishment of a neighboring cell list) of neighboring cell information, which does not require manual test and configuration of a live network.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely the embodiments of the present invention, and a person of ordinary skill in the art may still derive other drawings from these accompanying drawings without creative efforts.

DESCRIPTION OF EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
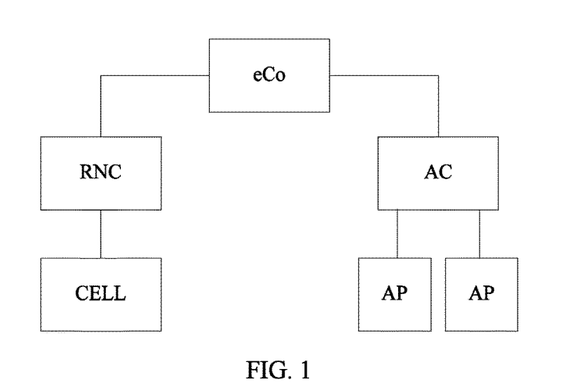
FIG. 1 is a schematic diagram of a network architecture according to an embodiment of the present invention.

Referring to FIG. 1, FIG. 1 is a schematic diagram of a network architecture provided in an embodiment of the present invention. eCo in FIG. 1 is an inter-network coordination device, connected between a macro cellular network and a wireless local area network (WLAN). RNC is a radio network controller, which is a device on a macro cellular network side. CELL is a macro cell. AC is an access controller. AP is a radio access point. AC and AP are devices on a WLAN network side. A terminal device has a WiFi module, and WiFi can be automatically started by installing an App client or performing ROM customization (such as an IOS system, an Android system, and a WP system of Microsoft). The terminal device may directly obtain an identity (such as an AP MAC address) of the AP in the WLAN network. Alternatively, a STA MAC (in a wireless local area network, the terminal device with a WiFi module is referred to as a STA) address in the terminal device can be reported.

Figure 2:
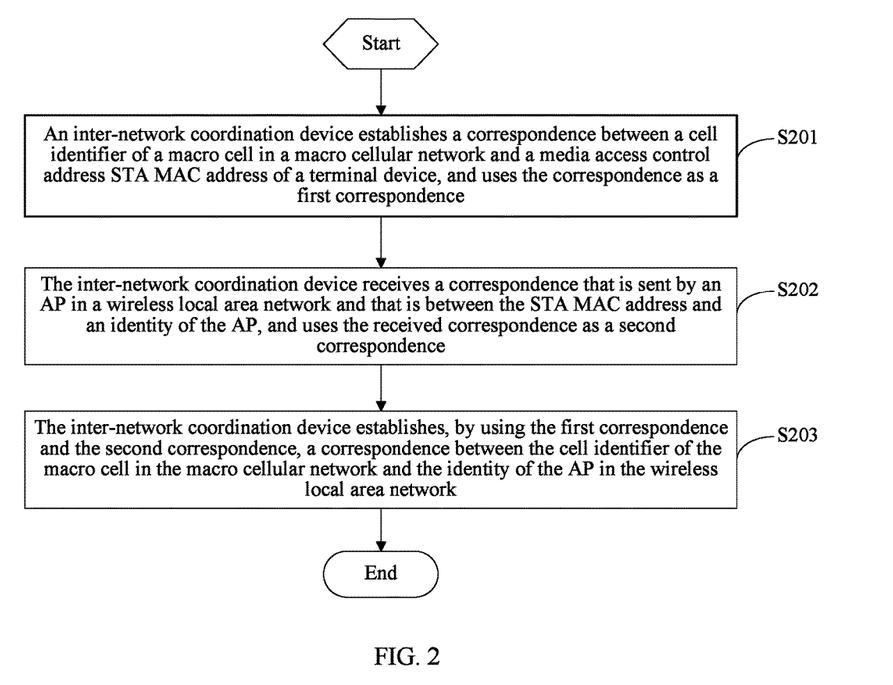
FIG. 2 is a schematic flowchart of a method for configuring a neighboring cell according to an embodiment of the present invention.

Based on the foregoing network architecture, if the technical solution of an embodiment of the present invention is described from the perspective of an inter-network coordination device, referring to FIG. 2, FIG. 2 is a schematic flowchart of a method for configuring a neighboring cell according to an embodiment of the present invention. The method may include:

Step S201: The inter-network coordination device establishes a correspondence between a cell identifier of a macro cell in a macro cellular network and a media access control address STA MAC address of a terminal device, and uses the established correspondence as a first correspondence.

In a possible implementation manner, the establishing, by an inter-network coordination device, a correspondence between a cell identifier of a macro cell in a macro cellular network and a STA MAC address of a terminal device is specifically: receiving, by the inter-network coordination device, the STA MAC address and a terminal device identifier (UE ID) that are sent by the terminal device by using the macro cellular network, determining a cell identifier that corresponds to the received UE ID and that is of the macro cell, and establishes a correspondence between the received STA MAC address and the determined cell identifier of the macro cell.

It should be noted that the inter-network coordination device pre-stores a correspondence between the cell identifier of the macro cell in the macro cellular network and the UE ID. When receiving the UE ID sent by the terminal device, the inter-network coordination device may determine, by using the correspondence between the cell identifier of the macro cell and the UE ID, the cell identifier that corresponds to the received UE ID and that is of the macro cell, so as to further establish a correspondence between the cell identifier that is of the macro cell and that is determined by the inter-network coordination device and the STA MAC address received by the inter-network coordination device.

Exemplarily, the inter-network coordination device maintains the correspondence between the cell identifier of the macro cell in the macro cellular network and the UE ID by using a table form, and a table of the correspondence between the cell identifier of the macro cell and the STA MAC address of the terminal device is shown as follows:

TABLE 1

| Cell identifier of a macro cell | STA MAC address of a terminal device |
|---|---|
| CELL ID1 | STA MAC1 |
| CELL ID2 | STA MAC2 |

Step S202: The inter-network coordination device receives a correspondence that is sent by an AP in a wireless local area network and that is between the STA MAC address and an identity of the AP, and uses the received correspondence as a second correspondence.

The identity of the AP may be a MAC address of the AP or a Basic Service Set Identification (BSSID) of the AP. In this embodiment of the present invention, the technical solution of this embodiment of the present invention is described by using an example in which the identity of the AP is the MAC address of the AP.

In this embodiment of the present invention, the terminal device sends a probing request message to the AP in the wireless local area network. The probing request message carries the STA MAC address of the terminal device. When receiving the probing request message sent by the terminal, the AP in the wireless local area network extracts the STA MAC address from the probing request message, establishes a correspondence between the STA MAC address and the AP MAC address, and then sends the established correspondence between the STA MAC address and the AP MAC address to the inter-network coordination device.

It can be understood that there are multiple methods for the AP to send the correspondence between the STA MAC address and the identity of the AP to the inter-network coordination device. In a possible implementation manner, the AP sends the correspondence between the STA MAC address and the identity of the AP to the inter-network coordination device by using a table form.

Exemplarily, the correspondence that is established by the AP in the wireless local area network and that is between the STA MAC address and the AP MAC address is shown in the following Table 2:

TABLE 2

| STA MAC address of a terminal device | AP MAC address of a neighboring cell |
|---|---|
| STA MAC1 | AP MAC1 |
| STA MAC2 | AP MAC2 |

The AP sends the correspondence between the STA MAC address and the identity of the AP to the inter-network coordination device at one time by using a table form shown in Table 2. In addition to this sending method, the AP may also send the correspondence between the STA MAC address and the identity of the AP to the inter-network coordination device multiple times by using one correspondence as a unit, or send the correspondence between the STA MAC address and the identity of the AP to the inter-network coordination device by using multiple correspondences as a unit. The embodiment of the present invention does not define a method for sending the correspondence, and a method for sending the correspondence belongs to the protection scope of this embodiment of the present invention as long as the AP sends the correspondence between the STA MAC address and the identity of the AP to the inter-network coordination device.

Step S203: The inter-network coordination device establishes, by using the first correspondence and the second correspondence, a correspondence between the cell identifier of the macro cell in the macro cellular network and the identity of the AP in the wireless local area network.

In this embodiment, the establishing, by the inter-network coordination device by using the first correspondence and the second correspondence, a correspondence between the cell identifier of the macro cell in the macro cellular network and the AP MAC address of the AP in the WLAN network is specifically: searching, by the inter-network coordination device, the first correspondence for a STA MAC address that is the same as the STA MAC address in the second correspondence, using the found STA MAC address as a first STA MAC address, obtaining, from the first correspondence, a cell identifier corresponding to the first STA MAC address as a first cell identifier and obtaining, from the second correspondence, the identity of the AP corresponding to the first STA MAC address as an identity of a first AP, associates the first cell identifier with the identity of the first AP, and establishes a correspondence between the first cell identifier and the identity of the first AP.

Similarly, using an example in which the first correspondence is in a table form (Table 1) and the second correspondence is in a table form (Table 2), for the STA MAC1 in Table 2, the STA MAC address of Table 1 is searched for the STA MAC1. If the STA MAC1 is found, it is considered that the AP corresponding to the STA MAC1 is a neighboring cell of a macro cell corresponding to the STA MAC1, a macro cell identifier CELL ID1 corresponding to the STA MAC1 is obtained from Table 1, and AP MAC1 corresponding to the STA MAC1 is obtained from Table 2, and then the STA MAC1 is associated with the AP MAC1, that is, a correspondence between the STA MAC1 and the AP MAC1 is established.

It should be noted that the correspondence between the cell identifier of the macro cell in the macro cellular network and the identity of the AP in the wireless local area network may also be in a table form. As shown in Table 3, Table 3 is a table established, by using Table 1 and Table 2, for the correspondence between the cell identifier of the macro cell in the macro cellular network and the AP MAC address of the AP in the wireless local area network:

TABLE 3

| Cell identifier of a macro cell | AP MAC address of a neighboring cell |
|---|---|
| CELL ID1 | AP MAC1 |
| CELL ID2 | AP MAC2 |

In the method for configuring a neighboring cell provided in this embodiment of the present invention, an inter-network coordination device first establishes a correspondence between a STA MAC address on a macro network side and a cell identifier of a macro cell. After receiving a correspondence that is sent by an AP in a wireless local area network and that is between the STA MAC address and an identity of the AP, the inter-network coordination device matches the received STA MAC address with the STA MAC address on the macro network side, and further establishes a correspondence between the cell identifier of the macro cell in a macro cellular network and the identity of the AP in the wireless local area network. The method for configuring a neighboring cell provided in this embodiment of the present invention can implement automatic configuration (for example, automatic establishment of a neighboring cell list) of neighboring cell information, which does not require manual test and configuration of a live network.

Figure 3:
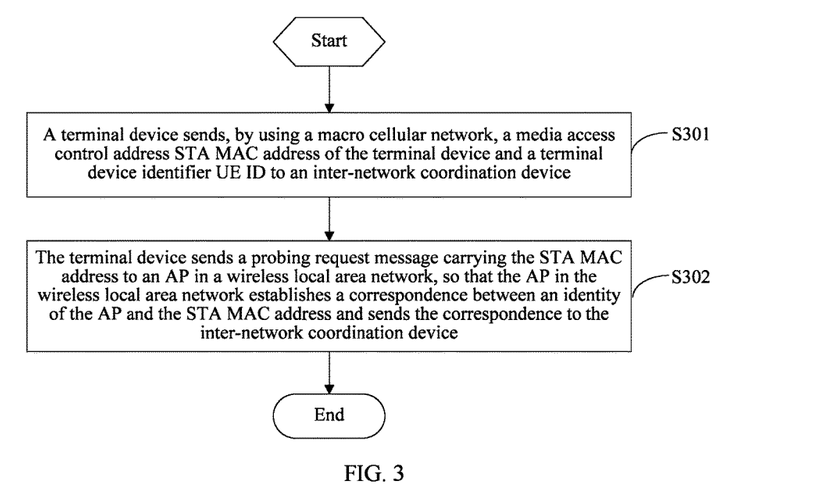
FIG. 3 is a schematic flowchart of a method for reporting neighboring cell information according to an embodiment of the present invention.

Correspondingly, if the technical solution of an embodiment of the present invention is described from the perspective of a terminal device, referring to FIG. 3, FIG. 3 is a schematic flowchart of a method for reporting neighboring cell information according to an embodiment of the present invention. The method may include:

Step S301: A terminal device sends, by using a macro cellular network, a media access control address STA MAC address of the terminal device and a terminal device identifier UE ID to an inter-network coordination device.

The UE ID is used to determine a cell identifier that corresponds to the STA MAC address and that is of a macro cell in the macro cellular network.

When performing registration or performing a service, the terminal device reports the STA MAC address of the terminal device and the UE ID (such as an international mobile subscriber identity, IMSI) of the terminal device to the inter-network coordination device. Because the STA MAC address and the UE ID in the terminal device correspond to each other, when receiving the STA MAC address and the UE ID synchronously, the inter-network coordination device may establish, by using the UE ID, a correspondence between a cell identifier of a macro cell on a macro network side and the STA MAC address.

Specifically, the inter-network coordination device may pre-store a correspondence between the cell identifier of the macro cell in the macro cellular network and the UE ID. When receiving the UE ID sent by the terminal device, the inter-network coordination device may determine, by using the correspondence between the cell identifier of the macro cell and the UE ID, the cell identifier that corresponds to the received UE ID and that is of the macro cell, so as to further establish a correspondence between the cell identifier that is of the macro cell and that is determined by the inter-network coordination device and the STA MAC address received by the inter-network coordination device.

Step S302: The terminal device sends a probing request message carrying the STA MAC address to an AP in a wireless local area network, so that the AP in the wireless local area network establishes a correspondence between an identity (such as an AP MAC address) of the AP and the STA MAC address and sends the correspondence between the identity of the AP and the STA MAC address to the inter-network coordination device.

The terminal device sends a probing request carrying the STA MAC address to the AP in the wireless local area network. After receiving the probing request message, the AP in the wireless local area network extracts the STA MAC address from the probing request message, establishes a correspondence between the identity (such as an AP MAC address) of the AP and the STA MAC address, and then sends the established correspondence between the identity of the AP and the STA MAC address to the inter-network coordination device. The inter-network coordination device establishes, by using the correspondence between the cell identifier of the macro cell and the STA MAC address and the correspondence between the identity of the AP and the STA MAC address, a correspondence between the cell identifier of the macro cell in the macro cellular network and the identity of the AP in the wireless local area network, and this correspondence is neighboring cell configuring information.

In the method for reporting neighboring cell information provided in this embodiment of the present invention, a terminal device may report a STA MAC address in the terminal device and a UE ID of the terminal device to an inter-network coordination device, and may also send a probing request message to an AP in a wireless local area network, so that the AP may establish a correspondence between an identity of the AP and the STA MAC address and send the correspondence to the inter-network coordination device. Therefore, the inter-network coordination device may establish a correspondence between a cell identifier of a macro cell in a macro cellular network and the identity of the AP in the wireless local area network. By using the method for reporting neighboring cell information provided in this embodiment of the present invention, the inter-network coordination device can automatically implement configuration of a neighboring cell, which does not require manual configuration.

In the method for configuring a neighboring cell provided in the foregoing embodiment, when performing neighboring cell configuration, an inter-network coordination device first obtains two correspondences, that is, a correspondence between a cell identifier of a macro cell and a STA MAC address and a correspondence between the STA MAC address and an identity of an AP, and then associates the cell identifier of the macro cell with the identity of the AP of the neighboring cell by using the STA MAC addresses, so as to establish neighboring cell configuring information. Because two correspondences need to be obtained and the STA MAC addresses in the two correspondences need to be matched to establish the neighboring cell configuring information, it can be known by using the foregoing process that a process for implementing neighboring cell configuration by the inter-network coordination device is complex. In order to further simplify the process of neighboring cell configuration, this embodiment of the present invention provides another method for configuring a neighboring cell.

Figure 4:
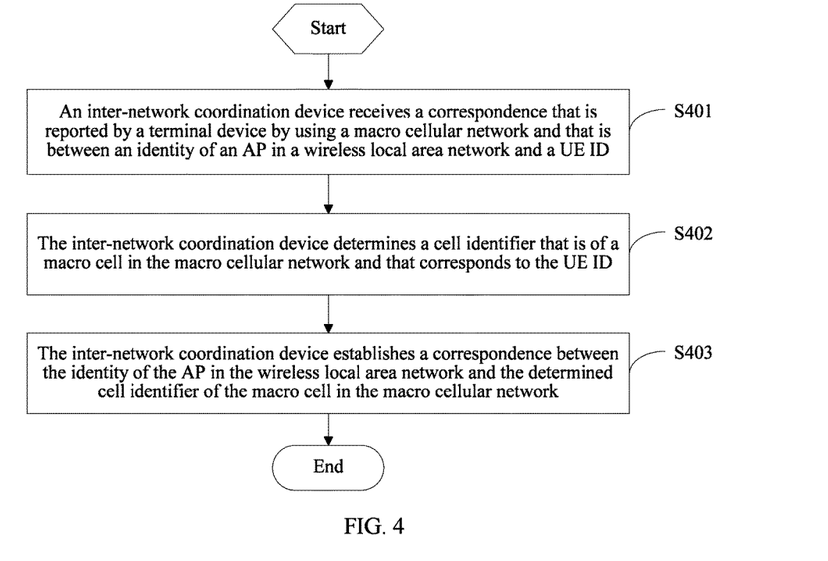
FIG. 4 is a schematic flowchart of another method for configuring a neighboring cell according to an embodiment of the present invention.

If the technical solution of an embodiment of the present invention is described from the perspective of an inter-network coordination device, referring to FIG. 4, FIG. 4 is a schematic flowchart of another method for configuring a neighboring cell according to an embodiment of the present invention. The method may include:

Step S401: An inter-network coordination device receives a correspondence that is reported by a terminal device by using a macro cellular network and that is between an identity of an AP in a wireless local area network and a UE ID.

The identity of the AP may be a MAC address of the AP or a BSSID of the AP.

In this embodiment, when performing a service, the terminal device may turn on a WiFi module for scanning so as to obtain the identity (such as an AP MAC address) of the AP in the wireless local area network. Moreover, after obtaining the identity of the AP in the wireless local area network, the terminal device may associate the identity of the AP with the UE ID of the terminal device, establish a correspondence between the identity of the AP and the UE ID, and then reports the correspondence to an inter-network coordination device by using a CELL and an RNC.

Step S402: The inter-network coordination device determines a cell identifier that is of a macro cell in the macro cellular network and that corresponds to the UE ID.

Specifically, the inter-network coordination device may pre-store a correspondence between the cell identifier of the macro cell in the macro cellular network and the UE ID. When receiving the UE ID sent by the terminal device, the inter-network coordination device may determine, by using the correspondence between the cell identifier of the macro cell and the UE ID, the cell identifier that corresponds to the received UE ID and that is of the macro cell.

Step S403: The inter-network coordination device establishes a correspondence between the identity of the AP in the wireless local area network and the determined cell identifier of the macro cell in the macro cellular network.

Exemplarily, the correspondence established by the inter-network coordination device is in a table form (that is, a correspondence table), and a table of the correspondence that is established by the inter-network coordination device and that is between the AP MAC address of the AP in the wireless local area network and the cell identifier of the macro cell in the macro cellular network is shown as follows:

TABLE 4

| Cell identifier of a macro cell | AP MAC address of a neighboring cell |
|---|---|
| CELL ID1 | AP MAC1 |
| CELL ID2 | AP MAC2 |

In the method for configuring a neighboring cell provided in this embodiment of the present invention, an inter-network coordination device may receive a correspondence that is reported by a terminal device and that is between an identity of an AP and a UE ID, and then further establish, by using the correspondence, a correspondence between a cell identifier of a macro cell and the identity of the AP. By using the method for reporting neighboring cell information provided in this embodiment of the present invention, the inter-network coordination device can automatically implement configuration of a neighboring cell, which does not require manual configuration and has a simple implementation process.

Figure 5:
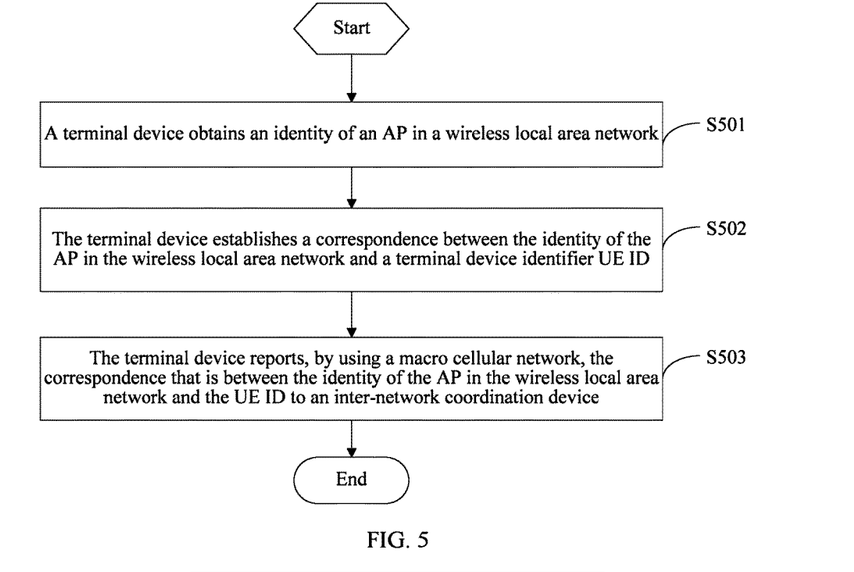
FIG. 5 is a schematic flowchart of another method for reporting neighboring cell information according to an embodiment of the present invention.

Correspondingly, if the technical solution of an embodiment of the present invention is described from the perspective of a terminal device, referring to FIG. 5, FIG. 5 is another schematic flowchart of a method for reporting neighboring cell information according to an embodiment of the present invention. The method may include:

Step S501: A terminal device obtains an identity of an AP in a wireless local area network.

The identity of the AP may be a MAC address of the AP or a BSSID of the AP.

In this embodiment, when performing a service, the terminal device turns on a WiFi module to perform scanning to obtain the identity (such as an AP MAC address) of the AP in the wireless local area network. Specifically, a probing request message is sent to the AP in the wireless local area network by using the WiFi module. After receiving the probing request message, the AP in the wireless local area network returns a probing response message to the terminal device, where the probing response message carries the identity (such as an AP MAC address) of the AP. After receiving the probing response message returned by the AP, the terminal device extracts the identity of the AP from the probing response message.

Step S502: The terminal device establishes a correspondence between the identity of the AP in the wireless local area network and a terminal device identifier UE ID.

Specifically, after extracting the identity (such as an AP MAC address) of the AP from the probing response message, the terminal device associates the identity of the AP with the UE ID, and establishes a correspondence between the identity of the AP and the UE ID.

Step S503: The terminal device reports, by using a macro cellular network, the correspondence that is between the identity of the AP in the wireless local area network and the UE ID to an inter-network coordination device.

The UE ID of the terminal device is used to determine a cell identifier that corresponds to the identity (an AP MAC address) of the AP in the wireless local area network and that is of a macro cell in the macro cellular network.

After receiving the correspondence that is reported by the terminal device and that is between the identity of the AP (the AP MAC address) and the UE ID, the inter-network coordination device determines a cell identifier that corresponds to the UE ID and that is of the macro cell, and then establishes a correspondence between the determined cell identifier of the macro cell and the UE ID, where the correspondence is neighboring cell configuring information.

Specifically, the inter-network coordination device may pre-store a correspondence between the cell identifier of the macro cell in the macro cellular network and the UE ID. When receiving the UE ID sent by the terminal device, the inter-network coordination device may determine, by using the correspondence between the cell identifier of the macro cell and the UE ID, the cell identifier that corresponds to the received UE ID and that is of the macro cell.

In the method for reporting neighboring cell information provided in this embodiment of the present invention, a terminal device may obtain an identity of an AP in a wireless local area network through scanning, associates the identity of the AP with a UE ID of the terminal device, and reports the correspondence between the identity of the AP and the UE ID to an inter-network coordination device, so that the inter-network coordination device establishes, based on the correspondence between the identity of the AP and the UE ID, a correspondence between the identity of the AP and a cell identifier of a macro cell. By using the method for reporting neighboring cell information provided in this embodiment of the present invention, the inter-network coordination device can automatically implement configuration of a neighboring cell, which does not require manual configuration and has a simple implementation process.

Figure 6:
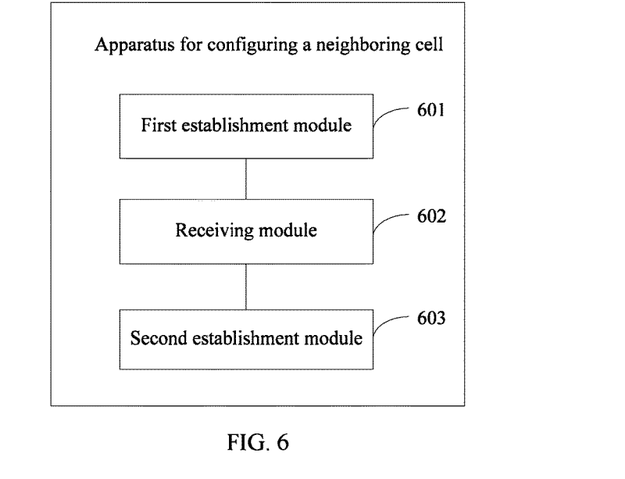
FIG. 6 is a schematic structural diagram of an apparatus for configuring a neighboring cell according to an embodiment of the present invention.

Referring to FIG. 6, FIG. 6 is a schematic structural diagram of an apparatus for configuring a neighboring cell according to an embodiment of the present invention. The apparatus is applied to an inter-network coordination device, and the apparatus may include: a first establishment module 601, a receiving module 602, and a second establishment module 603.

The first establishment module 601 is configured to: establish a correspondence between a cell identifier of a macro cell in a macro cellular network and a media access control address (STA MAC) address of a terminal device, and use the established correspondence as a first correspondence.

The receiving module 602 is configured to: receive a correspondence that is sent by an access point (AP) in a wireless local area network and that is between the STA MAC address of the terminal device and an identity of the AP, and use the received correspondence as a second correspondence.

The identity of the AP may be a MAC address of the AP or a BSSID of the AP.

The second establishment module 603 is configured to establish, by using the first correspondence established by the first establishment module 601 and the second correspondence received by the receiving module 602, a correspondence between the cell identifier of the macro cell in the macro cellular network and the identity of the AP in the wireless local area network.

The apparatus for configuring a neighboring cell provided in this embodiment of the present invention may establish a correspondence between a STA MAC address on a macro network side and a cell identifier of a macro cell. After receiving a correspondence that is sent by an AP in a wireless local area network and that is between the STA MAC address and an identity of the AP, the apparatus for configuring a neighboring cell matches the received STA MAC address with the STA MAC address on the macro network side, and further establishes a correspondence between the cell identifier of the macro cell in a macro cellular network and the identity of the AP in the wireless local area network. The apparatus for configuring a neighboring cell provided in this embodiment of the present invention can implement automatic configuration of neighboring cell information, which does not require manual test and configuration of a live network.

The first establishment module 601 in the foregoing embodiment may include: a receiving submodule, a determining submodule, and a first establishment submodule.

The receiving submodule is configured to receive the STA MAC address and a terminal device identifier (UE ID) that are reported by the terminal device by using the macro cellular network.

The determining submodule is configured to determine a cell identifier that is of a macro cell and that corresponds to the UE ID received by the receiving submodule.

The first establishment submodule is configured to establish a correspondence between the STA MAC address received by the receiving submodule and the cell identifier that is of the macro cell and that is determined by the determining submodule.

The second establishment module 603 in the foregoing embodiment may include: a search submodule, an obtaining submodule, and a second establishment submodule.

The search submodule is configured to: search the first correspondence for a STA MAC address that is the same as the STA MAC address in the second correspondence, and use the found STA MAC address as a first STA MAC address.

The obtaining submodule is configured to: obtain, from the first correspondence, a cell identifier corresponding to the first STA MAC address found by the search submodule as a first cell identifier, and obtain, from the second correspondence, an identity of an AP corresponding to the first STA MAC address found by the search submodule as an identity of a first AP.

The second establishment submodule is configured to establish a correspondence between the first cell identifier obtained by the obtaining submodule and the identity of the first AP.

Figure 7:
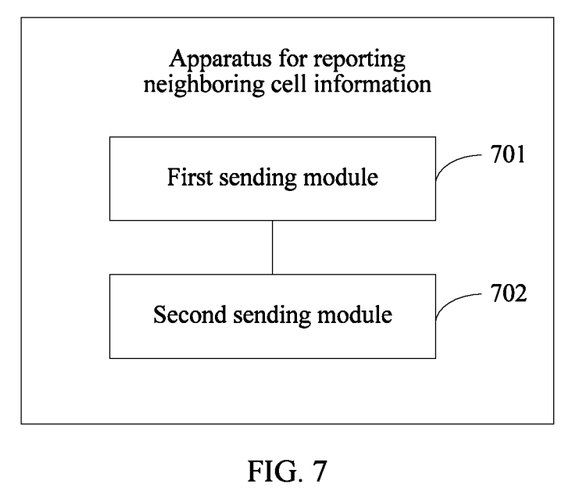
FIG. 7 is a schematic structural diagram of an apparatus for reporting neighboring cell information according to an embodiment of the present invention.

Referring to FIG. 7, FIG. 7 is a schematic structural diagram of an apparatus for reporting neighboring cell information according to an embodiment of the present invention. The apparatus is applied to a terminal device, and the apparatus may include: a first sending module 701 and a second sending module 702.

The first sending module 701 is configured to send, by using a macro cellular network, a media access control address (STA MAC) address of a terminal device and a terminal device identifier (UE ID) to an inter-network coordination device.

The UE ID is used to determine a cell identifier that corresponds to the STA MAC address and that is of a macro cell in the macro cellular network.

The second sending module 702 is configured to send a probing request carrying the STA MAC address to an access point (AP) in a wireless local area network, so that the AP in the wireless local area network establishes a correspondence between the identity of the AP and the STA MAC address and sends the correspondence to the inter-network coordination device.

The identity of the AP may be a MAC address of the AP or a BSSID of the AP.

The apparatus for reporting neighboring cell information provided in this embodiment of the present invention may report a STA MAC address of a terminal device and a UE ID of the terminal device to an inter-network coordination device, and may also send a probing request message to an AP in a wireless local area network, so that the AP may establish a correspondence between an identity of the AP and the STA MAC address and send the correspondence to the inter-network coordination device. Therefore, the inter-network coordination device may establish a correspondence between a cell identifier of a macro cell in a macro cellular network and the identity of the AP in the wireless local area network. By using the apparatus for reporting neighboring cell information provided in this embodiment of the present invention, the inter-network coordination device can implement automatic configuration of neighboring cell information, which does not require manual test and configuration of a live network.

Figure 8:
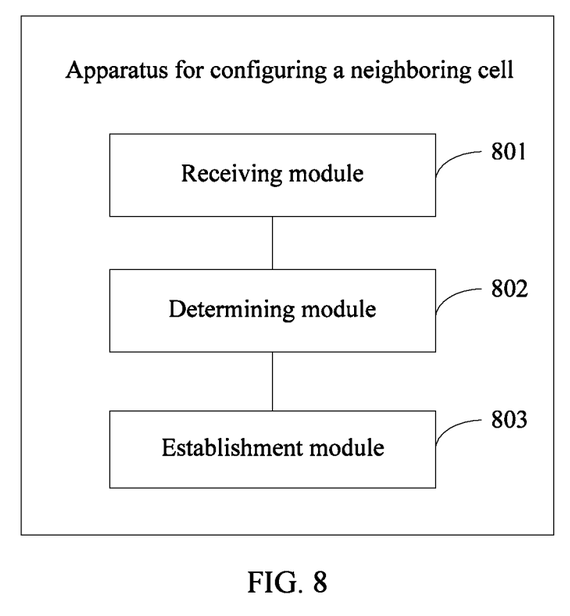
FIG. 8 is a schematic structural diagram of another apparatus for configuring a neighboring cell according to an embodiment of the present invention.

Referring to FIG. 8, FIG. 8 is a schematic structural diagram of another apparatus for configuring a neighboring cell according to an embodiment of the present invention. The apparatus is applied to an inter-network coordination device, and the apparatus may include: a receiving module 801, a determining module 802, and an establishment module 803.

The receiving module 801 is configured to receive a correspondence that is reported by a terminal device by using a macro cellular network and that is between an identity of an access point (AP) in a wireless local area network and a terminal device identifier (UE ID).

The determining module 802 is configured to determine a cell identifier that is of a macro cell in the macro cellular network and that corresponds to the UE ID in the correspondence received by the receiving module 801.

The establishment module 803 is used to establish a correspondence between the cell identifier determined by the determining module 802 and the identity of the AP in the correspondence received by the receiving module 801.

The apparatus for configuring a neighboring cell provided in this embodiment of the present invention may receive a correspondence that is reported by a terminal device and that is between an identity of an AP and a UE ID, and then further establish, by using the correspondence, a correspondence between a cell identifier of a macro cell and the identity of the AP. The apparatus for configuring a neighboring cell provided in this embodiment of the present invention can implement automatic configuration of neighboring cell information, which does not require manual test and configuration of a live network.

Figure 9:
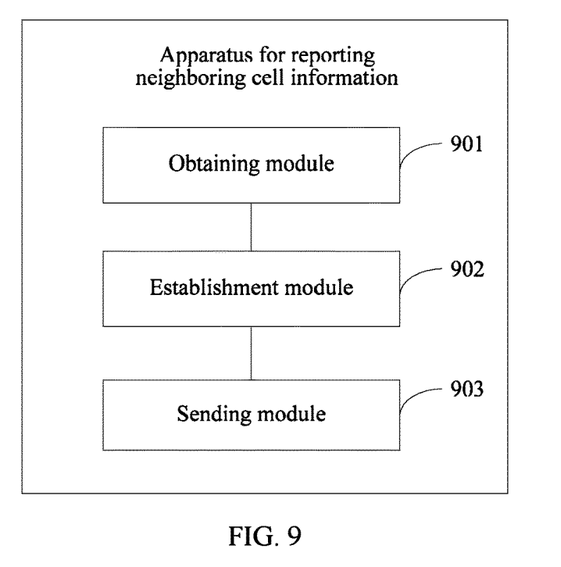
FIG. 9 is a schematic structural diagram of another apparatus for reporting neighboring cell information according to an embodiment of the present invention.

Referring to FIG. 9, FIG. 9 is a schematic structural diagram of an apparatus for reporting neighboring cell information according to an embodiment of the present invention. The apparatus is applied to a terminal device, and the apparatus may include: an obtaining module 901, an establishment module 902, and a sending module 903.

The obtaining module 901 is configured to obtain an identity of an access point (AP) in a wireless local area network.

The establishment module 902 is configured to establish a correspondence between a terminal device identifier (UE ID) and the identity that is of the AP and that is obtained by the obtaining module 901.

The sending module 903 is configured to send, by using a macro cellular network, the correspondence established by the establishment module 902 to an inter-network coordination device.

The UE ID of the terminal device is used to determine a cell identifier that corresponds to the identity of the AP in the wireless local area network and that is of a macro cell in the macro cellular network.

The apparatus for reporting neighboring cell information provided in this embodiment of the present invention may obtain an identity (such as an AP MAC address) of an AP in a wireless local area network through scanning, associates the identity of the AP with a UE ID of a terminal device, and reports a correspondence between the identity of the AP and the UE ID to an inter-network coordination device, so that the inter-network coordination device establishes, based on the correspondence between the identity of the AP and the UE ID, a correspondence between the identity of the AP and a cell identifier of a macro cell. By using the apparatus for reporting neighboring cell information provided in this embodiment of the present invention, the inter-network coordination device can automatically implement configuration of neighboring cell information, which does not require manual configuration.

The obtaining module 901 in the foregoing embodiment may include a sending submodule, a receiving submodule, and an extracting submodule.

The sending submodule is configured to send a probing request message to the AP in the wireless local area network.

The receiving submodule is configured to receive a probing response message that is sent by the AP and that carries the identity (such as an AP MAC address) of the AP.

The extraction submodule is configured to extract the identity of the AP from the probing response message received by the receiving submodule.

In an actual application, the apparatus for configuring a neighboring cell shown in FIG. 6 is specifically applied to an inter-network coordination device. By deploying the inter-network coordination device of the apparatus for configuring a neighboring cell shown in FIG. 6, configuration of neighboring cell information may be automatically implemented.

Figure 10:
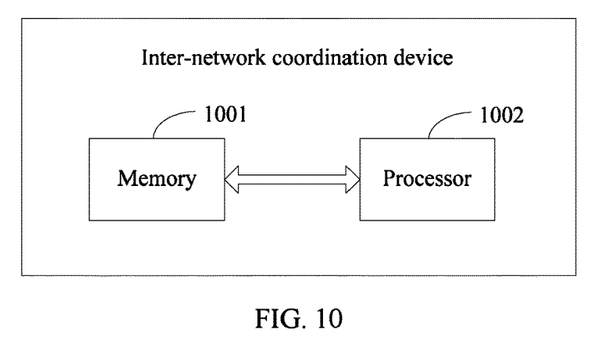
FIG. 10 is a schematic structural diagram of an inter-network coordination device according to an embodiment of the present invention.

Referring to FIG. 10, FIG. 10 is a schematic structural diagram of an inter-network coordination device according to an embodiment of the present invention. The inter-network coordination device may include at least a memory 1001 and a processor 1002 connected to the memory 1001 by using a communications bus.

The memory 1001 may be configured to store a software program and a module. The processor 1002 executes various functional applications of the inter-network coordination device and data processing by running the software program and the module that are stored in the memory 1001. The memory 1001 may include a high-speed random access memory, and may also include a non-volatile memory, for example, at least one magnetic disk storage device, a flash storage device, or another volatile solid-state storage device.

The processor 1002 is a control center of the inter-network coordination device, uses various interfaces and lines to connect all the parts of a whole server, and executes various functions of the inter-network coordination device and processes data by running or executing the software program and/or the module that are/is stored in the memory 1001 and by invoking data stored in the memory 1001, so as to perform overall monitoring on the inter-network coordination device.

In this embodiment of the present invention, the processor 1002 included in the inter-network coordination device has the following functions: establishing a correspondence between a cell identifier of a macro cell in a macro cellular network and a media access control address (STA MAC) address of a terminal device, and using the established correspondence as a first correspondence; receiving a correspondence that is sent by an access point (AP) in a wireless local area network and that is between the STA MAC address and an identity of the AP, and using the received correspondence as a second correspondence; and establishing, by using the first correspondence and the second correspondence, a correspondence between the cell identifier of the macro cell in the macro cellular network and the identity of the AP in the wireless local area network.

Figure 11:
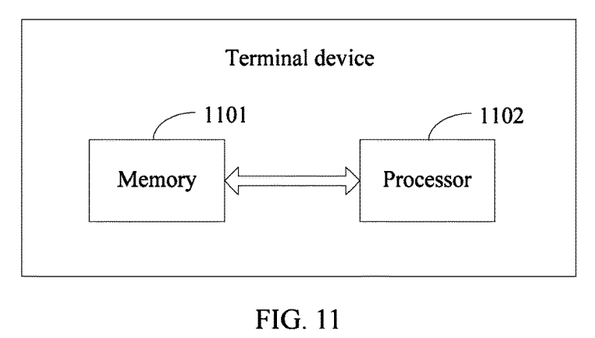
FIG. 11 is a schematic structural diagram of a terminal device according to an embodiment of the present invention.

In an actual application, the apparatus for reporting neighboring cell information shown in FIG. 7 is specifically applied to a terminal device. Referring to FIG. 11, FIG. 11 is a schematic structural diagram of a terminal device according to an embodiment of the present invention. The terminal device may include at least a memory 1101 and a processor 1102 connected to the memory 1101 by using a communications bus.

The memory 1101 may be configured to store a software program and a module. The processor 1102 executes various functional applications of the terminal device and data processing by running the software program and the module that are stored in the memory 1101. The memory 1101 may include a high-speed random access memory, and may also include a non-volatile memory, for example, at least one magnetic disk storage device, a flash storage device, or another volatile solid-state storage device.

The processor 1102 is a control center of the terminal device, uses various interfaces and lines to connect all the parts of a whole server, and executes various functions of the terminal device and processes data by running or executing the software program and/or the module that are/is stored in the memory 1101 and by invoking data stored in the memory 1101, so as to perform overall monitoring on the terminal device.

In this embodiment of the present invention, the processor 1102 included in the terminal device has the following functions: sending, by using a macro cellular network, a media access control address (STA MAC) address of the terminal device and a terminal device identifier (UE ID) to an inter-network coordination device, where the UE ID is used to determine a cell identifier that corresponds to the STA MAC address and that is of a macro cell in the macro cellular network; and sending a probing request carrying the STA MAC address to an access point (AP) in a wireless local area network, so that the AP in the wireless local area network establishes a correspondence between the identity of the AP and the STA MAC address and sends the correspondence between the identity of the AP and the STA MAC address to the inter-network coordination device.

In an actual application, the apparatus for configuring a neighboring cell shown in FIG. 8 is specifically applied to an inter-network coordination device. By deploying the inter-network coordination device of the apparatus for configuring a neighboring cell shown in FIG. 8, configuration of neighboring cell information may be automatically implemented.

Figure 12:
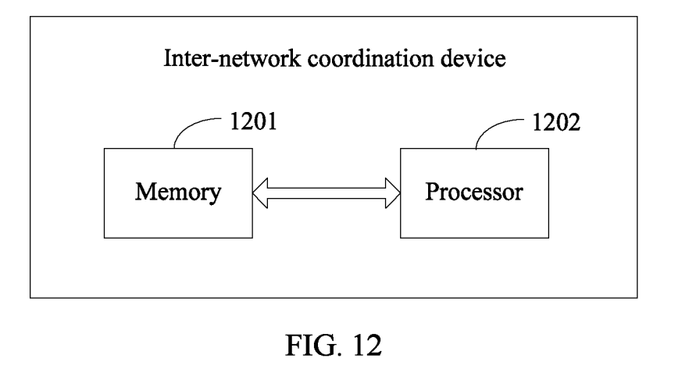
FIG. 12 is a schematic structural diagram of another inter-network coordination device according to an embodiment of the present invention.

Referring to FIG. 12, FIG. 12 is a schematic structural diagram of another inter-network coordination device according to an embodiment of the present invention. The inter-network coordination device may include at least a memory 1201 and a processor 1201 connected to the memory 1202 by using a communications bus.

The memory 1201 may be configured to store a software program and a module. The processor 1202 executes various functional applications of an inter-network coordination device and data processing by running the software program and the module that are stored in the memory 1201. The memory 1201 may include a high-speed random access memory, and may also include a non-volatile memory, for example, at least one magnetic disk storage device, a flash storage device, or another volatile solid-state storage device.

The processor 1202 is a control center of the inter-network coordination device, uses various interfaces and lines to connect all the parts of a whole server, and executes various functions of the inter-network coordination device and processes data by running or executing the software program and/or the module that are/is stored in the memory 1201 and by invoking data stored in the memory 1201, so as to perform overall monitoring on the inter-network coordination device.

In this embodiment of the present invention, the processor 1202 included in the inter-network coordination device has the following functions: receiving a correspondence that is reported by a terminal device by using a macro cellular network and that is between an identity of an access point (AP) in a wireless local area network and a terminal device identifier (UE ID); determining a cell identifier that is of a macro cell in the macro cellular network and that corresponds to the UE ID; and establishing a correspondence between the determined cell identifier of the macro cell in the macro cellular network and the identity of the AP in the wireless local area network.

Figure 13:
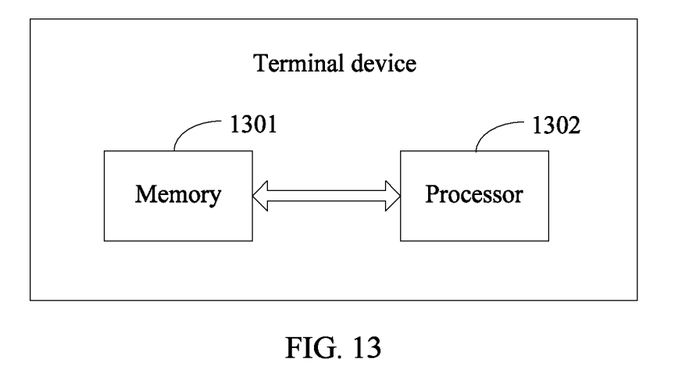
FIG. 13 is a schematic structural diagram of another terminal device according to an embodiment of the present invention.

In an actual application, the apparatus for reporting neighboring cell information shown in FIG. 9 is specifically applied to a terminal device. Referring to FIG. 13, FIG. 13 is a schematic structural diagram of another terminal device according to an embodiment of the present invention. The terminal device may include at least a memory 1301 and a processor 1302 connected to the memory 1301 by using a communications bus.

The memory 1301 may be configured to store a software program and a module. The processor 1302 executes various functional applications of the terminal device and data processing by running the software program and the module that are stored in the memory 1301. The memory 1301 may include a high-speed random access memory, and may also include a non-volatile memory, for example, at least one magnetic disk storage device, a flash storage device, or another volatile solid-state storage device.

The processor 1302 is a control center of the terminal device, uses various interfaces and lines to connect all the parts of a whole server, and executes various functions of the terminal device and processes data by running or executing the software program and/or the module that are/is stored in the memory 1301 and by invoking data stored in the memory 1301, so as to perform overall monitoring on the terminal device.

In this embodiment of the present invention, the processor 1302 included in the terminal device has the following functions: obtaining an identity of an access point (AP) in a wireless local area network; establishing a correspondence between the identity of the AP in the wireless local area network and a terminal device identifier (UE ID); and sending, by using a macro cellular network, the correspondence between the identity of the AP in the wireless local area network and the UE ID to an inter-network coordination device, where the UE ID of the terminal device is used to determine a cell identifier that corresponds to the identity of the AP in the wireless local area network and that is of a macro cell in the macro cellular network.

Each embodiment in this specification focuses on differences from the other embodiments, and for a same or similar part of each embodiment, refer to each other. The apparatus disclosed in the embodiments of this specification is described relatively simply because it corresponds to the method disclosed in the embodiments, and for portions related to those of the method, reference may be made to the description of the method.

In the several embodiments provided in this application, it should be understood that the disclosed method, apparatus, and device may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some communication interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributable to the prior art, or some of the technical solutions may be implemented in a form of a software product. The software product may be stored in a storage medium, and may include several instructions for instructing a computer device (which may be a personal computer, a server, or a network device) to perform all or some of the steps of the methods described in the embodiments of the present invention. The foregoing storage medium may include: any medium that can store program code, such as a Universal Serial Bus (USB) flash drive, a removable hard disk, a read-only memory (ROM), a random access memory (RAM), a magnetic disk, or an optical disc.

The embodiments disclosed above are described to enable a person skilled in the art to implement or use the present application. Various modifications made to the embodiments will be obvious to a person skilled in the art, and the general principles defined herein may also be implemented in other embodiments without departing from the spirit or scope of the present application. Therefore, the present application is not intended to be limited to these embodiments illustrated herein, but shall be construed in the widest scope consistent with the principles and novel features disclosed herein.

What is claimed is:

1. An apparatus for configuring a neighboring cell, applied to an inter-network coordination device, and comprising a processor and a non-transitory computer-readable storage medium including computer-executable instructions executed by the processor to perform operations comprising:
    establishing a correspondence between a cell identifier of a macro cell in a macro cellular network and a media access control (STA MAC) address of a terminal device, and using the established correspondence as a first correspondence, wherein the establishing step comprises:
        receiving, by the macro cellular network, the STA MAC address and a terminal device identifier (UE ID) reported by the terminal device;
        determining a cell identifier of a macro cell that corresponds to the received UE ID;
        establishing a correspondence between the received STA MAC address and the determined cell identifier of the macro cell;
    receiving a correspondence that is sent by an access point (AP) in a wireless local area network (WLAN) and that is between the STA MAC address and an identity of the AP, and using the received correspondence as a second correspondence; and
    establishing, by using the first correspondence and the second correspondence, a correspondence between the cell identifier of the macro cell in the macro cellular network and the identity of the AP in the WLAN.

2. The apparatus according to claim 1, wherein the establishing, by using the first correspondence and the second correspondence, a correspondence between the cell identifier of the macro cell in the macro cellular network and the identity of the AP in the WLAN comprises:
    searching the first correspondence for a STA MAC address that is the same as the STA MAC address in the second correspondence, and using the found STA MAC address as a first STA MAC address;
    obtaining, from the first correspondence, a cell identifier corresponding to the first STA MAC address found as a first cell identifier, and obtaining, from the second correspondence, an identity of an AP corresponding to the first STA MAC address found as an identity of a first AP; and establishing a correspondence between the obtained first cell identifier and the identity of the first AP.

3. An inter-network coordination device, comprising at least a processor and a non-transitory memory including computer-executable program instructions executed by the processor to perform operations comprising:

establishing a correspondence between a cell identifier of a macro cell in a macro cellular network and a media access control address (STA MAC) address of a terminal device, and using the established correspondence as a first correspondence, wherein the establishing step comprises:

receiving, by the inter-network coordination device, the STA MAC address and a terminal device identifier (UE ID) that are reported by the terminal device by using the macro cellular network;

determining a cell identifier that corresponds to the UE ID and that is of a macro cell; and establishing a correspondence between the STA MAC address and the cell identifier of the macro cell;

receiving a correspondence that is sent by an access point (AP) in a wireless local area network (WLAN) and that is between the STA MAC address and an identity of the AP, and using the received correspondence as a second correspondence; and establishing, by using the first correspondence and the second correspondence, a correspondence between the cell identifier of the macro cell in the macro cellular network and the identity of the AP in the wireless local area network.

4. A method for configuring a neighboring cell, comprising:

establishing, by an inter-network coordination device, a correspondence between a cell identifier of a macro cell in a macro cellular network and a media access control (STA MAC) address of a terminal device, and using the established correspondence as a first correspondence, wherein the establishing step comprises:

receiving, by the inter-network coordination device, the STA MAC address and a terminal device identifier (UE ID) that are reported by the terminal device by using the macro cellular network;

determining a cell identifier that corresponds to the UE ID and that is of a macro cell; and establishing a correspondence between the STA MAC address and the cell identifier of the macro cell;

receiving, by the inter-network coordination device, a correspondence that is sent by an access point (AP) in a wireless local area network (WLAN) and that is between the STA MAC address and an identity of the AP, and using the received correspondence as a second correspondence; and establishing, by the inter-network coordination device by using the first correspondence and the second correspondence, a correspondence between the cell identifier of the macro cell in the macro cellular network and the identity of the AP in the WLAN.

5. The method according to claim 4, wherein the establishing, by the inter-network coordination device by using the first correspondence and the second correspondence, a correspondence between the cell identifier of the macro cell in the macro cellular network and the identity of the AP in the WLAN comprises:

searching, by the inter-network coordination device, the first correspondence for a STA MAC address that is the same as the STA MAC address in the second correspondence, and using the found STA MAC address as a first STA MAC address;

obtaining, from the first correspondence, a cell identifier corresponding to the first STA MAC address as a first cell identifier, and obtaining, from the second correspondence, the identity of the AP corresponding to the first STA MAC address as an identity of a first AP; and establishing a correspondence between the first cell identifier and the identity of the first AP.

* * * * *